(12) United States Patent
Dunn et al.

(10) Patent No.: US 8,434,427 B2
(45) Date of Patent: May 7, 2013

(54) STYPTIC APPLICATOR WITH FILE

(75) Inventors: Steven B. Dunn, Beverly Hills, CA (US); Bryce Fujii, Canoga Park, CA (US); Kevin Clark, Los Angeles, CA (US)

(73) Assignee: Doskocil Manufacturing Company, Inc., Arlington, TX (US)

( * ) Notice: Subject to any disclaimer, the term of this patent is extended or adjusted under 35 U.S.C. 154(b) by 2103 days.

(21) Appl. No.: 10/757,109

(22) Filed: Jan. 14, 2004

(65) Prior Publication Data

US 2005/0150466 A1 Jul. 14, 2005

(51) Int. Cl.
*A01K 29/00* (2006.01)

(52) U.S. Cl.
USPC ............... 119/605; 168/46; 168/48.1; 132/75

(58) Field of Classification Search .................. 119/605, 119/652, 602, 600, 601, 650; 168/45, 46, 168/48.1; 132/73, 73.5, 74.5, 75, 75.3, 75.6, 132/76.4

See application file for complete search history.

(56) References Cited

U.S. PATENT DOCUMENTS

| | | | | |
|---|---|---|---|---|
| 632,072 A * | 8/1899 | Thurber | .......................... | 30/321 |
| 1,629,967 A * | 5/1927 | Rex | .............................. | 132/75.3 |
| 1,837,849 A * | 12/1931 | Bruninghaus | ................... | 132/75 |
| 1,925,140 A * | 9/1933 | Gardiner | ....................... | 132/74.5 |
| 2,046,002 A * | 6/1936 | Hunter | ......................... | 132/74.5 |
| 2,273,559 A * | 2/1942 | Burnett | ......................... | 132/318 |
| 2,290,886 A * | 7/1942 | Lenz | .............................. | 604/309 |
| 2,632,446 A * | 3/1953 | Rosenzweig | ................. | 604/310 |
| 2,747,330 A | 5/1956 | Simpkins | | |
| 2,870,573 A | 1/1959 | Scadden | | |
| 3,275,132 A * | 9/1966 | Hultgren | .......................... | 401/6 |
| 4,747,842 A * | 5/1988 | Dietz | ............................ | 604/309 |
| 4,891,882 A * | 1/1990 | Bloom et al. | ................. | 30/123.3 |
| 4,892,882 A | 1/1990 | Tomita et al. | | |
| 5,168,935 A * | 12/1992 | Thornbury et al. | .......... | 168/48.1 |
| 5,279,837 A * | 1/1994 | Hill | ............................... | 424/682 |
| 5,292,203 A | 3/1994 | Whitman | | |
| 5,443,172 A * | 8/1995 | Gabriele | ....................... | 215/303 |
| 5,471,745 A * | 12/1995 | Wendell | ....................... | 30/123.3 |
| 5,533,262 A | 7/1996 | Clark | | |
| 5,546,658 A | 8/1996 | MacLeod et al. | | |
| 5,676,643 A * | 10/1997 | Cann et al. | ........................ | 604/1 |
| 5,758,010 A * | 5/1998 | Ando | .............................. | 386/87 |
| 5,762,077 A * | 6/1998 | Griffiths, Jr. | ................. | 132/74.5 |
| 5,871,124 A * | 2/1999 | Wilkinson | ..................... | 222/192 |
| 5,897,262 A * | 4/1999 | Bratby-Carey | ................. | 401/18 |
| 5,983,498 A * | 11/1999 | Lieberman et al. | ............... | 30/28 |
| 6,102,254 A * | 8/2000 | Ross | .............................. | 222/192 |
| 6,142,155 A * | 11/2000 | Rudolph | ....................... | 132/76.4 |
| 6,155,270 A * | 12/2000 | Samiean | ......................... | 132/73 |
| 6,289,901 B1 | 9/2001 | Singer et al. | | |
| 6,505,686 B2 * | 1/2003 | Rovelli | ........................... | 168/45 |

(Continued)

*Primary Examiner* — Yvonne Abbott (74) *Attorney, Agent, or Firm* — Eckert Seamans Cherin & Mellott, LLC; Brij K. Agarwal (57) ABSTRACT

A styptic powder applicator and file for use with pets. The applicator is designed to be integrated with the container and have a funnel-like shape in order to handle a styptic powder in an easier fashion. The container further has a file attached to a side of the container for the removal of burrs left after clipping a pet's nails. This invention provides a more efficient structure for grooming a pet by incorporating a file for removing burrs with the styptic applicator for staunching the flow of blood from a "quicked" nail.

58 Claims, 4 Drawing Sheets

U.S. PATENT DOCUMENTS

| | | | |
|---|---|---|---|
| 6,523,264 B1 * | 2/2003 | Albert et al. | 30/123.3 |
| 6,572,580 B2 | 6/2003 | Feldman | |
| 6,827,038 B2 * | 12/2004 | Dunn et al. | 119/600 |
| 7,168,461 B2 * | 1/2007 | DeJonge | 141/22 |
| 2004/0191317 A1 * | 9/2004 | Kaplan | 424/486 |
| 2005/0217685 A1 * | 10/2005 | Burkholz et al. | 132/74.5 |

* cited by examiner

STYPTIC APPLICATOR WITH FILE

BACKGROUND OF THE INVENTION

1. Field of the Invention

This invention relates to the field of pet grooming. Specifically the invention relates to the field of nail clipping and grooming, and in particular to a styptic powder dispenser and file.

2. Description of the Related Technology

To correctly accomplish the task of trimming a pet's nails a groomer/owner needs to cut and file the nail. When clipping, there is significant hazard of "quicking" the nail and causing the animal to bleed. It is recommended that a styptic material be applied to the nail to stop the bleeding. Depending on the severity of the cut, blood loss can lead to serious harm, including the death of the pet. Currently styptics are sold in several material compositions: powder, gel, pencil, and liquid. Powder is the most common form and is usually sold in cylindrical containers.

Current styptics are difficult and messy to apply. The styptic tends to get all over the pet owner and the pet. A struggling pet makes it important to be able to supply the styptic quickly and efficiently. In addition, there is the risk of contamination of the reservoir of styptic material if the bleeding nail is introduced directly to the stored material. There is therefore a need in the field for an improved styptic applicator.

A second issue in the grooming process is the removal of burrs after nail clipping. Pet nails should be filed after clipping to remove burrs, which can cause damage to carpets, furniture and clothing. Currently, files are sold separately requiring the user to locate the file after clipping. This causes frustration when someone has misplaced a file, and cannot find it immediately. There is therefore a need in the field to provide a single device capable of dispensing and applying styptic and filing a pet's nails that makes grooming more convenient and efficient.

SUMMARY OF THE INVENTION

Accordingly it is an object of this invention to provide field to provide a single device capable of dispensing and applying styptic and filing a pet's nails that makes grooming more convenient and efficient.

In order to achieve the above and other objects of the invention, a styptic applicator for pets according to a first aspect of the invention includes a container with a chamber for filling with a styptic; a removable cap for the container; an applicator device for applying the styptic; and a filing device.

According to a second aspect of the invention, a styptic applicator for pets includes storing structure for holding a styptic; application structure for applying the styptic; covering structure for sealing the storing structure; and filing structure for filing a nail.

According to a third aspect of the invention, a styptic applicator for pets includes a container with a chamber for filling with a styptic; a removable cap for the container; an applicator device for applying the styptic wherein the applicator device has a concave shape in order to hold the styptic.

According to a fourth aspect of the invention, a styptic applicator for pets includes a container with a chamber for filling with a styptic; and a filing device.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

The styptic applicator is preferably employed in the care of pets, and in particular the grooming of pets. When an owner is grooming an animal, such as a dog, typically the nails need to be clipped. This presents a certain hazard to the animal. If the clipping occurs to close to the "quick" the nail will begin to bleed. This is due to a vein in the nail. This bleeding needs to be staunched as soon as possible, and typically a styptic device will be employed. Additionally, while clipping the nail burrs can be created. These burrs can snag carpet and wreck furniture; therefore it is important to be able to file away these burrs. Both the "quicking" of the nail and the creation of burrs occur at roughly the same time and therefore the necessity of having both a styptic device and a file all in one becomes paramount.

Figure 1:
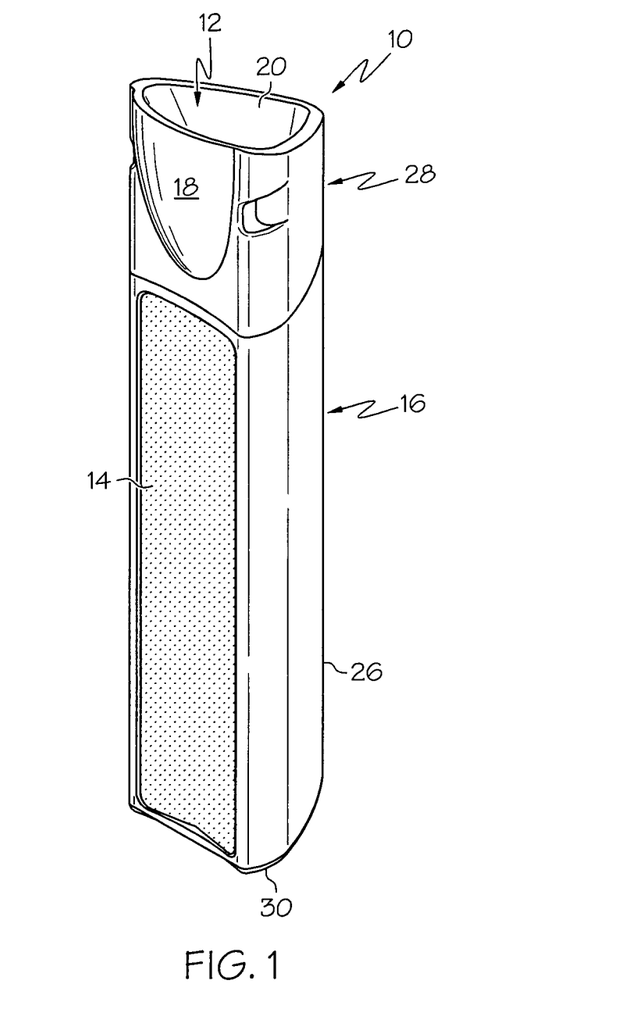
FIG. 1 is an isometric view of a styptic applicator that is constructed according to a preferred embodiment of the invention.

Referring now to the drawings, wherein like reference numerals designate corresponding structure throughout the views, FIG. 1 shows an overview of a styptic applicator 10 that is constructed according to a preferred embodiment of the invention.

Styptic applicator 10 has a container 16, a cap 28 and a file 14. From the drawing it can be seen that cap 28 further has a concave structure 20 located on the top portion of the cap 28. This concave structure 20 is where a styptic powder is placed, and makes up part of the applicator device 12. Cap 28 also has a depression 18 so that a user can easily grab hold of the cap 28. The container includes sides 26 and bottom 30. In the embodiment shown in FIG. 1, a file 14 is attached to a side 26. Furthermore, container 16 has a chamber 24 that stores the styptic powder for future use.

Figure 2:
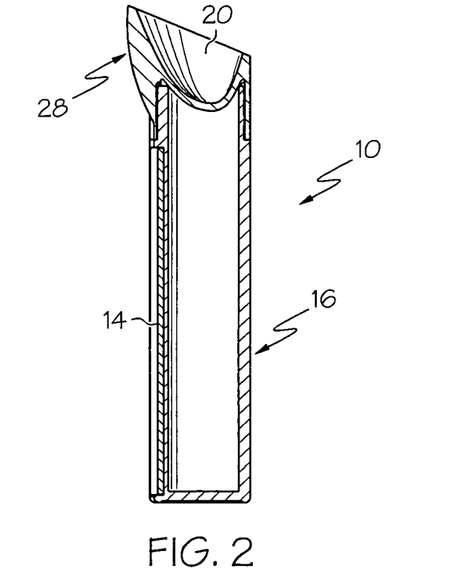
FIG. 2 is a cross-sectional view of the styptic applicator that is depicted in FIG. 1.

FIG. 2 shows a cross-sectional view of the styptic applicator 10. In particular this cross-section shows the chamber 24 that is located on the interior of the container 16. The container 16 is triangular in shape in order to match the shape of the cap 28. However, it is possible to make the container in any variety of shapes, such a cylindrical shape, in order to maximize the volume of powder to be stored.

In the preferred embodiment, the chamber 24 is filled with a styptic powder. However it is to be understood that the styptic could alternatively be a powder, gel, pencil, or liquid. The styptic powder may also contain a desiccant for keeping the powder from caking and to permit the powder to pour easily into the concave structure 20. In the preferred embodiment, the top portion of the container 16 has a locking rim to click the cap 28 into place, and there is a keying mechanism so that the cap 28 turns in one direction.

When a person wishes to use the styptic applicator 10, the cap 28 will be removed from the container 16. This will permit access to the chamber 24. A person can then pour the styptic powder into the concave structure 20 that is located at the top portion of the cap 28. The cap 28 can then be placed back on the container 16 with the powder inside the concave structure 20, and the entire structure can then be used to apply the styptic to the pet. Alternatively, the cap 28 can remain separate from the container 16 during the application of the styptic. One benefit of this is that the reservoir of styptic material within the container 16 will not be directly exposed to the bleeding animal during application, thereby providing a measure of security against the styptic material becoming contaminated by the animal. The cap 28 may also be removed after use so that it may be washed.

The cap 28 as shown in FIG. 1 is sized to fit the container 16 so that the cap 28 is flush with side 26. FIG. 1, also shows the cap 28 having a depression 18 for a person's finger to grasp the cap 28. Alternatively, instead of a depression 18, the cap 28 can have an elastomeric material to make grasping it easier. The figures show the cap 28 being triangular in shape, however like the container 16, the shape of the cap 28 may be that of any one of a variety of shapes.

Figure 7:
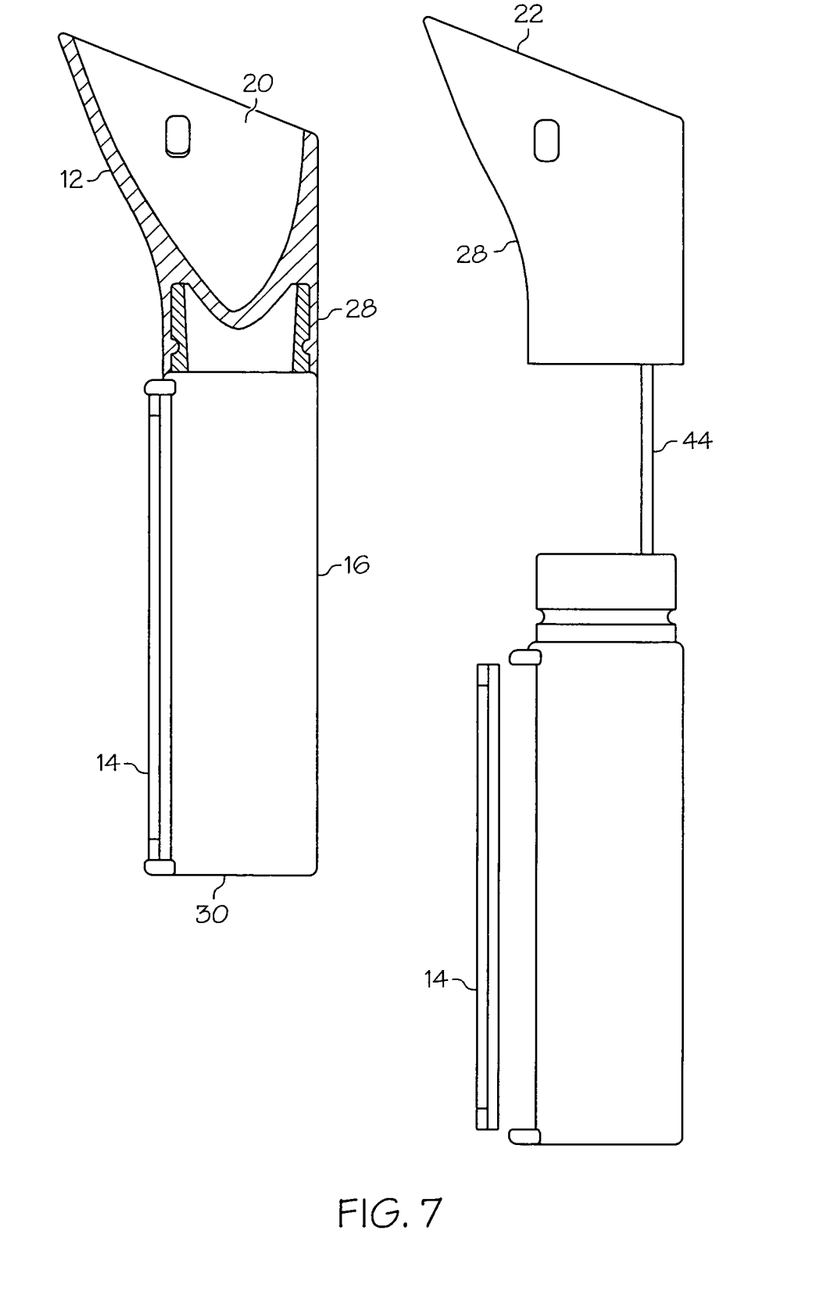
FIG. 7 is a depiction of two side views of the styptic applicator showing the extended handle with a cross-sectional view of the cap when showing the styptic container in the closed position.

In an alternative embodiment, as shown in FIG. 7, the cap 28 may have an extended handle 44 that a person can use to hold the applicator while applying the styptic. In the preferred embodiment the container 16 acts as the handle after the cap 28 is placed back on the container 16. In an alternative embodiment, the extended handle 44 can extend down from the cap 28 into the chamber 24 when the cap 28 is placed on the container 16. When the extended handle 44 is placed within the chamber 24 it is concealed from view. This provides a compact design while further removing the step of placing the cap 28 back onto the container 16 before applying the styptic. A person merely has to grasp the extended handle 44 in order to apply the styptic. In another embodiment, the handle can be part of a sleeve mechanism that extends into container 16. This gives the person who is using the applicator a larger handle to grasp when applying the styptic, while in additionally eliminating the step of replacing the cap 28 back on the container 16 before using the applicator device 12.

Figure 3:
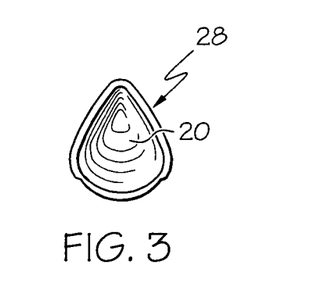
FIG. 3 is a top plan view of the styptic applicator that is depicted in FIG. 1.
Figure 4:
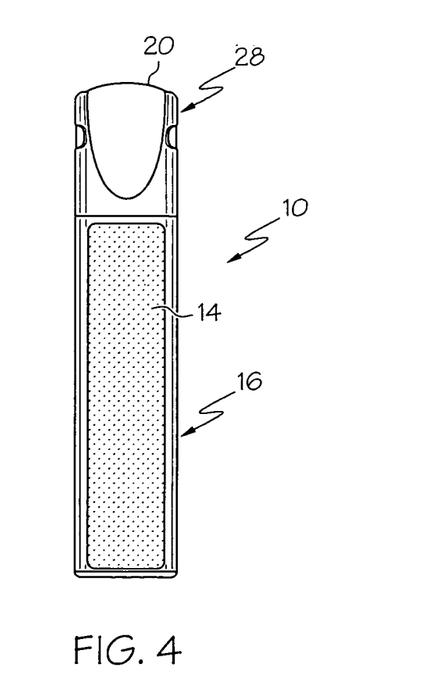
FIG. 4 is a front elevational view of the styptic applicator that is depicted in FIG. 1.
Figure 5:
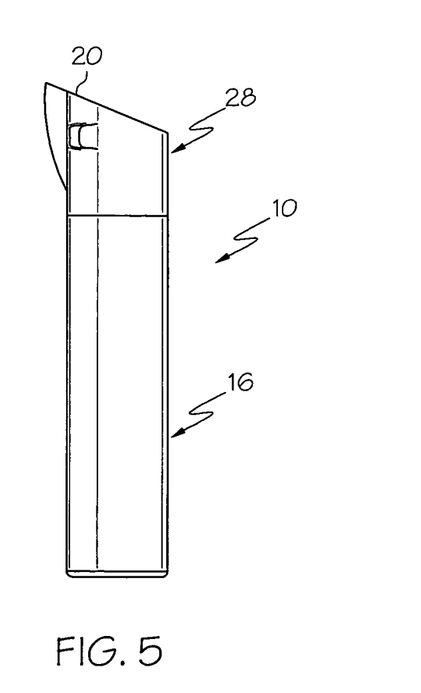
FIG. 5 is a side elevational view of the styptic applicator that is depicted in FIG. 1.

Cap 28 contains the applicator device 12. The applicator device 12 is that part of the cap 28 that comprises the concave structure 20 and the spout 22. In the preferred embodiment the applicator device 12 is sized in such a way as to permit easy application of the styptic to a pet. As shown in FIG. 2, the concave structure 20 has an angled slope. The angled slope helps to form the spout 22. FIG. 3 shows a top down view of the cap 28, and shape of the concave structure 20 in the preferred embodiment. FIG. 5 shows the spout 22 from a side view. FIG. 4 shows the spout 22 from forward view. The conical, or bowl-like, shape of the concave structure 20 helps to compress the styptic into the end of the hollow nail from which blood emerges. Furthermore, the shape of the concave structure 20 and the spout 22 makes it easier for the unused portion of the styptic powder to be placed back in the chamber 24, after application to the nail is finished. The shape also prevents the powder from spilling all over the pet and its owner. Alternatively, having a cylindrical shape for the applicator device 12 will permit a wider stream.

Filing device 14 can be seen in FIG. 1, FIG. 2, FIG. 4, FIG. 6, and FIG. 7. In the preferred embodiment, the filing device extends along a side 26 of the styptic applicator 10. The filing device 14 can be used while attached to side 26 with the remainder of the container 16 being used as a handle mechanism. A person uses the filing device 14 to file down burrs on the nail of a pet left after clipping, or simply to file the pet's nails.

Figure 6:
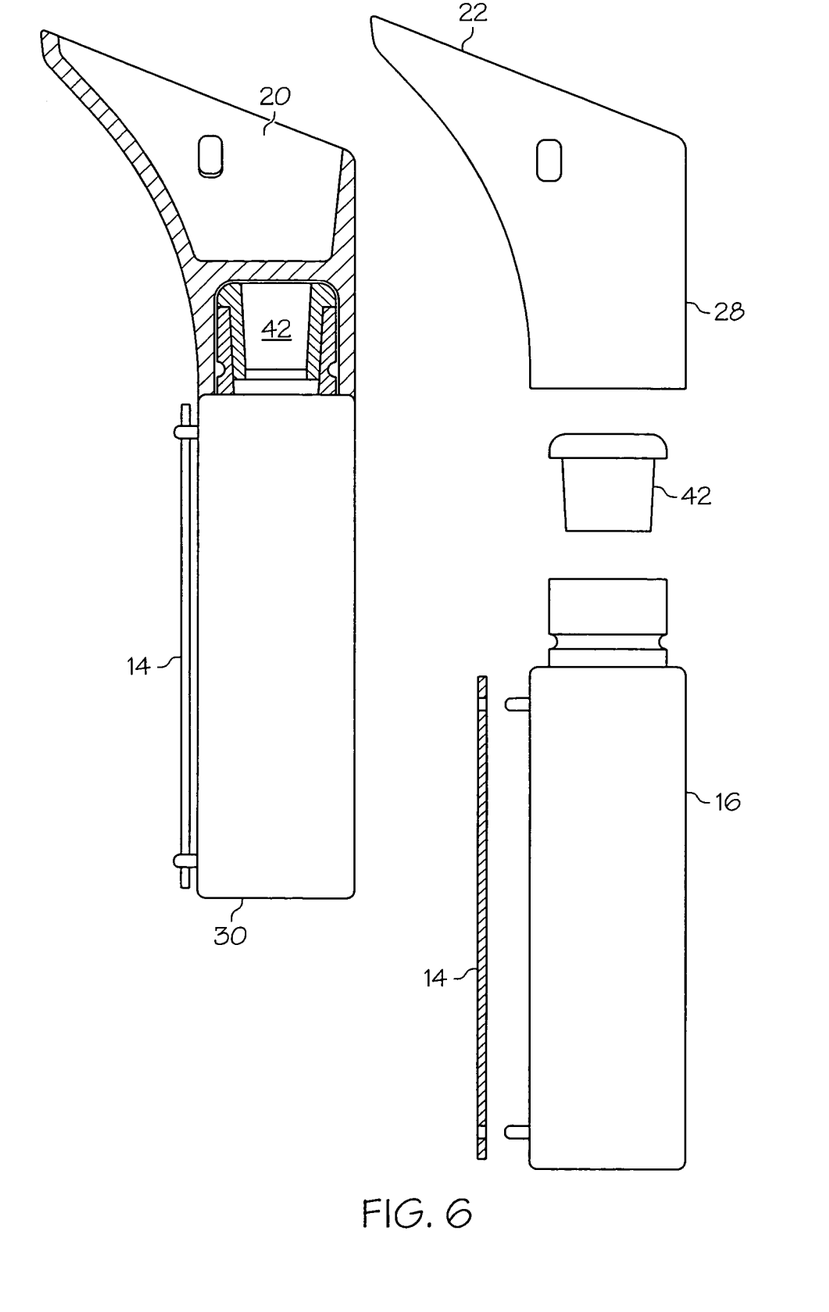
FIG. 6 is a depiction of two side views of the styptic applicator showing the stopper with a cross-sectional view of the cap when showing the styptic container in the closed position.

The filing device 14 can be a nail file attached to a side 26. Alternatively, the filing device 14 can be attached to other locations on the styptic applicator 10. The filing device 14 can be attached to the cap 28, or other areas at the top of the styptic applicator 10. Furthermore, the filing device 14 can be attached to the bottom 30 of the container 16. In an alternative embodiment wherein there is a sleeve mechanism, the filing device 14 can be attached to an exterior of the handle. As shown in FIG. 6, the filing device 14 is removable from the container 16. In the preferred embodiment wherein the filing device 14 is preferably removable with respect to the container 16, this requires there to be some sort of attachment mechanism. The attachment mechanism can be that of a snapping mechanism, or a sticky material may be placed on the styptic applicator 10, in order to place the file. Alternatively, some sort of hook and loop mechanism can be employed. By having the filing device 14 be removable from the styptic applicator, it can then be replaced when it has been worn down. Alternatively the filing device 14 can be made integral with the container 16, and therefore would comprise one of the sides 26 of the container 16.

The filing device 14 can be made of any number of materials including emery board material, metal, sandpaper, etc. In a preferred embodiment the filing device 14 will have a herringbone crosshatch. There can also be different coarse and fine areas on the filing device 14.

FIG. 6, shows an optional stopper 42 for use with applicator 10. The stopper 42 is sized to fit within the top opening of the container 16 and able to fit within the bottom opening of the cap 28. The stopper 42 provides an extra barrier for preventing accidental spillage of the styptic upon removal of the cap 28 from the container 16.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A styptic applicator for pets comprising:
a container with a chamber containing a styptic;
a removable cap for said container;
an applicator device for applying the styptic; and
a filing device.

2. A styptic applicator according to claim 1, wherein said filing device is located on a side of said container.

3. A styptic applicator according to claim 1, wherein said filing device is located on a bottom of said container.

4. A styptic applicator according to claim 1, wherein said filing device is located on a top portion of said container.

5. A styptic applicator according to claim 1, wherein said filing device has an attachment member for being removably attached to the container.

6. A styptic applicator according to claim 5, wherein said attachment member is a snap mechanism.

7. A styptic applicator according to claim 5, wherein said attachment member is a sticky material.

8. A styptic applicator according to claim 5, wherein said attachment member comprises a hook and loop mechanism.

9. A styptic applicator according to claim 1, wherein said filing device is made of emery board material.

10. A styptic applicator according to claim 1, wherein said filing device is made of metal.

11. A styptic applicator according to claim 10, wherein said filing device has a herring bone cross-hatch.

12. A styptic applicator according to claim 1, wherein said filing device is made of a sand-paper material.

13. A styptic applicator according to claim 1, wherein said filing device has both a coarse and a fine cross-hatch.

14. A styptic applicator according to claim 1, wherein said cap is integral with said applicator device, and said applicator device has a concave shape in order to hold said styptic.

15. A styptic applicator according to claim 14, wherein said concave shape is triangular.

16. A styptic applicator according to claim 15, wherein said concave shape is slanted to form a funnel shape.

17. A styptic applicator according to claim 14, wherein said applicator device has a spout.

18. A styptic applicator according to claim 1, wherein said cap is flush with a side of said container.

19. A styptic applicator according to claim 1, wherein said cap comprises a gripping surface, wherein said gripping surface comprises a depression on a side for gripping said cap.

20. A styptic applicator according to claim 1, wherein said cap comprises a gripping surface wherein said gripping surface is made of elastomeric material for improved gripping.

21. A styptic applicator according to claim 1, wherein said cap further comprises a handle for gripping said cap.

22. A styptic applicator according to claim 21, wherein said handle extends into said chamber of said container.

23. A styptic applicator for pets comprising:
storing means for holding a styptic;
a styptic held within said storing means;
application means for applying said styptic;
covering means for sealing said storing means;
filing means for filing a nail.

24. styptic applicator according to claim 23, wherein said filing means is located on a side of said storing means.

25. A styptic applicator according to claim 23, wherein said filing means is located on a bottom of said storing means.

26. A styptic applicator according to claim 23, wherein said filing means is located on said covering means.

27. A styptic applicator according to claim 23, wherein said filing means has attachment means for being removably attached to the container.

28. A styptic applicator according to claim 27, wherein said attachment means is one of the following; a snap mechanism, a sticky material, or a hook and loop mechanism.

29. A styptic applicator according to claim 23, wherein said filing means is made of one of the following; metal, sand-paper, or an emery board material.

30. A styptic applicator according to claim 23, wherein said filing means has a herring bone cross-hatch.

31. A styptic applicator according to claim 23, wherein said filing means has both a coarse and a fine cross-hatch.

32. A styptic applicator according to claim 23, wherein said application means has a concave shape in order to hold said styptic.

33. A styptic applicator according to claim 32, wherein said concave shape is triangular.

34. A styptic applicator according to claim 32, wherein said concave shape is slanted to form a funnel shape.

35. A styptic applicator according to claim 23, wherein said applicator means has a spout.

36. A styptic applicator according to claim 23, wherein said covering means is flush with a side of said storing means.

37. A styptic applicator according to claim 23, wherein said covering means comprises gripping means for gripping said covering means, wherein said gripping means comprises a depression on a side for gripping said covering means.

38. A styptic applicator according to claim 23, wherein said cap comprises a gripping means for gripping said covering means wherein said gripping means is made of elastomeric material for improved gripping.

39. A styptic applicator according to claim 23, wherein said covering means further comprises a handle for gripping said cap.

40. A styptic applicator according to claim 39, wherein said handle extends into said storing means.

41. A styptic applicator for pets comprising:
a container with a chamber containing a styptic; and
a filing device.

42. A styptic applicator according to claim 41, wherein said filing device is located on a side of said container.

43. A styptic applicator according to claim 41, wherein said filing device is located on a bottom of said container.

44. A styptic applicator according to claim 41, wherein said filing device is located on a top portion of said container.

45. A styptic applicator according to claim 41, wherein said filing device has an attachment member for being removably attached to the container.

46. A styptic applicator according to claim 45, wherein said attachment member is a snap mechanism.

47. A styptic applicator according to claim 45, wherein said attachment member is a sticky material.

48. A styptic applicator according to claim 45, wherein said attachment member comprises a hook and loop mechanism.

49. A styptic applicator according to claim 41, wherein said filing device is made of emery board material.

50. A styptic applicator according to claim 41, wherein said filing device is made of metal.

51. A styptic applicator according to claim 41, wherein said filing device has a herring bone cross-hatch.

52. A styptic applicator according to claim 41, wherein said filing device is made of a sand-paper material.

53. A styptic applicator according to claim 41, wherein said filing device has both a coarse and a fine cross-hatch.

54. A styptic applicator according to claim 41, further comprising a removable cap.

55. A styptic applicator for pets comprising:
a container with a chamber for filling with a styptic;
a removable cap for said container;
an applicator device for applying the styptic;
a filing device; and
wherein said cap is integral with said applicator device, and said applicator device has a concave shape in order to hold said styptic.

56. A styptic applicator for pets comprising:
a container with a chamber for filling with a styptic;
a removable cap for said container wherein said cap further comprises a handle for gripping said cap;
an applicator device for applying the styptic; and
a filing device.

57. A styptic applicator for pets comprising:
storing means for holding a styptic;
application means for applying said styptic, wherein said application means has a spout;

covering means for sealing said storing means;
filing means for filing a nail.

58. A styptic applicator for pets comprising:
storing means for holding a styptic;
application means for applying said styptic;
covering means for sealing said storing means, wherein said covering means further comprises a handle for gripping said cap;
filing means for filing a nail.

* * * * *

UNITED STATES PATENT AND TRADEMARK OFFICE
CERTIFICATE OF CORRECTION

PATENT NO. : 8,434,427 B2
APPLICATION NO. : 10/757109
DATED : May 7, 2013
INVENTOR(S) : Steven B. Dunn et al.

It is certified that error appears in the above-identified patent and that said Letters Patent is hereby corrected as shown below:

In the Specification:

Column 1, line 41, "to provide field" should read --to provide--.
Column 1, line 42, "to provide a single" should read --a single--.
Column 2, line 16, "FIG. 1; and" should read --FIG. 1;--.
Column 2, line 23, "position;" should read --position; and--.
Column 2, line 36, "to close" should read --too close--.
Column 2, line 66, "such a cylindrical" should read --such as a cylindrical--.
Column 3, line 26, "FIG. 1, also" should read --FIG. 1 also--.
Column 3, line 48, "while in" should read --while--.
Column 3, line 60, "from forward" should read --from a forward--.
Column 4, line 37, "FIG. 6, shows" should read --FIG. 6 shows--.

In the Claims:

Column 5, Claim 23, line 42, "means;" should read --means; and--.
Column 5, Claim 24, line 44, "styptic applicator" should read --A styptic applicator--.
Column 7, Claim 57, line 1, "means;" should read --means; and--.
Column 7, Claim 58, line 9, "cap;" should read --cap; and--.

Signed and Sealed this
Tenth Day of September, 2013

Teresa Stanek Rea
*Acting Director of the United States Patent and Trademark Office*